United States Patent [19]

Osborn et al.

[11] 3,925,295

[45] Dec. 9, 1975

[54] PROCESS FOR THE PREPARATION OF POLYMER DISPERSIONS

[75] Inventors: Peter George Osborn, Windsor; Peter Francis Nicks, Maidenhead, both of England

[73] Assignee: Imperial Chemical Industries Limited, London, England

[22] Filed: Feb. 4, 1974

[21] Appl. No.: 439,640

Related U.S. Application Data

[63] Continuation of Ser. No. 237,522, March 23, 1972, abandoned.

[30] Foreign Application Priority Data

Mar. 30, 1971 United Kingdom............... 8164/71

[52] U.S. Cl..... 260/34.2; 260/33.6 R; 260/33.6 EP; 260/33.6 UB; 260/835; 260/836; 260/857 R; 260/857 G; 260/873

[51] Int. Cl.$^2$.. C08J 3/00; C08K 5/01; C08L 67/00; C08L 77/00

[58] Field of Search....... 260/34.2, 33.6 R, 33.6 EP, 260/33.6 UB, 33.6 SB

[56] References Cited
UNITED STATES PATENTS

| | | | |
|---|---|---|---|
| 3,383,352 | 5/1968 | Duell et al. | 260/34.2 |
| 3,532,663 | 10/1970 | Nicks et al. | 260/34.2 |
| 3,607,821 | 9/1971 | Clarke et al. | 260/34.2 |

*Primary Examiner*—Allan Lieberman
*Attorney, Agent, or Firm*—Cushman, Darby & Cushman

[57] ABSTRACT

Process for preparing a dispersion of a condensation polymer in a non-solvent liquid medium by heating in the medium at a temperature of at least 150°C. one or more polymer-forming reactants at least one of which is insoluble in the liquid medium and is present therein as the liquid disperse phase of an emulsion, in which the emulsifying agent is a polymeric material containing a specified chain-like component which is soluble and non-self-associated in the liquid disperse phase and a specified chain-like component of another type which is soluble and non-self-associated in the liquid of the continuous phase, and one of the chain-like components of an emulsifier present which is soluble in a disperse phase being also capable of associating with the polymer produced.

10 Claims, No Drawings

PROCESS FOR THE PREPARATION OF POLYMER DISPERSIONS

This is a continuation of application Ser. No. 237,522, filed Mar. 23, 1972, now abandoned.

This invention relates to a process for the preparation of dispersions of polymers in a liquid medium and especially to dispersions of condensation polymers as hereinafter defined formed from at least one reactant which is insoluble in the liquid medium. The invention is particularly applicable to processes performed in organic liquids.

By "condensation polymers" we mean polymers in which the links between the reactants which form the polymer involve atoms other than carbon and in which a low-molecular weight by-product is eliminated during the polymerisation reaction. Such polymers include, for example, polyesters and polyamides.

Our British Pat. No. 1,211,532 discloses and claims an emulsion in which the emulsifying agent is a polymeric material containing in its molecule at least one chain-like component of a type which is soluble and non-self-associated in the liquid of the disperse phase and at least one chain-like component of another type which is soluble and non-self-associated in the liquid of the continuous phase, the average molecular weight of the individual components being at least 1,000, the total molecular weight of the individual components of each type being at least 3,000 or at least $n \times 1,000$, where $n$ is the number of the individual components of the other type, whichever is the higher, and the ratio of the total weights of the individual components of the two types being from 3:1 to 1:3. Such emulsifying agents may be simple block copolymers consisting of two chain-like components, one of each type as described above, or they may be copolymers comprising a polymeric backbone providing one type of component and carrying, as one or more side chains, components of the other type. Emulsifying agents suitable for a variety of disperse and continuous phases are described in the said patent. The foregoing description of "emulsion" is incorporated as a definition thereof in this specification, and the disclosure of British Pat. No. 1,211,532 is to be understood as being incorporated herein by reference.

Our British Pat. Nos. 1,095,931 and 1,095,932 describe processes for the preparation of dispersions of heteroatomic polymers, including condensation polymers, in organic liquids in which the polymers are insoluble by reacting monomers in solution in the organic liquids. The need to find soluble monomers imposes some limitations on the practical value of these processes.

We have now found that using emulsions as claimed in British Pat. No. 1,211,532 it is possible to make dispersions of condensation polymers in liquid media from reactants which are insoluble in the said liquid media.

Accordingly, the present invention provides a process for the preparation of a dispersion of a condensation polymer as hereinbefore defined in a liquid medium in which the polymer is insoluble which comprises heating in the liquid medium at a temperature of at least 150°C. an appropriate polymer-forming reactant or reactants, the reactant or at least one of the reactants being insoluble in the liquid medium and being present as a liquid disperse phase in an emulsion as hereinbefore defined, one of the chain-like components of an emulsifying agent present which is soluble in a disperse phase being also capable of associating with the polymer produced.

By "insoluble" we mean sufficiently immiscible with the liquid medium to form a separate phase.

It is preferable, but not essential, that the liquid medium employed in the process should be capable of forming an azeotrope with the polymerisation by-product; such an azeotrope may or may not separate on standing into its constituents.

The process of the present invention is applicable to all normally liquid condensation polymer-forming reactants, but is especially convenient for polymer-forming reactants which are solid at room temperature but which can be melted in a liquid medium of suitably high boiling point so as to be in the liquid form at the start of the reaction. Such solid reactants which react to form condensation polymers tend to be less soluble and of higher melting point than reactants of this type which form addition polymers.

The present invention is also especially useful when the reactant or reactants are monomeric or of relatively low molecular weight comprising one or a small number of repeating units in the polymer produced. Such reactants would not normally be described as oligomers or low molecular weight polymers.

In some cases it is convenient for part of the reactant or reactants to be emulsified initially and the remainder to be added as the reaction proceeds so as to obtain stable emulsions with relatively simple process conditions. If all the reactant or reactants are present throughout this may interfere with the action of the emulsifying agent or agents by altering the solvent characteristics of the emulsion particle and/or the liquid medium.

The addition of further reactants to the preformed emulsion is preferably carried out under conditions of rigorous shearing and at such a rate that reaction to the desired polymer takes place without the emulsion becoming unstable. The further reactants may be liquids at the reaction temperatures which can be either miscible or immiscible in the reaction medium but with sufficient solubility to transfer across the medium to the preformed emulsion particle. In the case of solid reactants it may be convenient to add them as a solution in another liquid medium which is emulsifiable or soluble in the original liquid medium.

A catalyst, for example, an esterification catalyst, may be used to reduce reaction times, especially near to the end of the reaction.

The characteristics of the emulsifying agent which are necessary for the formation of a stable emulsion of a reactant have been referred to above and are set out in detail in the afore-mentioned British Pat. No. 1,211,532. Using the guidance provided therein a person skilled in the art will be able to select a liquid reactant emulsifying agent/polymer combination suitable in any specific case. A single emulsifying agent or more than one such agent may be present as required.

It is also necessary that the emulsifying agent, or at least one of the emulsifying agents if more than one is used, should comprise a chain-like component which is not only soluble and non-self-associated in a reactant disperse phase but is also capable of becoming associated with the condensation polymer product so that the emulsifying agent molecule as a whole becomes anchored to the particles of the product and the latter are thereby stabilised as a dispersion in the liquid medium. Such a capability may be introduced, for example, by providing the disperse phase-soluble component of the emulsifying agent with polar groups which can interact with complementary polar groups the polymer produced. Alternatively, it may be arranged that the disperse phase-soluble component comprises a polymeric chain the same or similar chemical composition as that of the polymer produced, so that this component becomes entangled in, and hence integrally associated with, the chains of the polymer produced. A preferred procedure is to employ an emulsifying agent which is of a composition satisfying the requirements for formation of a stable reactant emulsion and which also possesses reactive sites on the disperse phase-soluble component which are capable of participating in the condensation polymerisation reaction. For example, the component in question may be provided with carboxylic acid groups which can take part in a condensation reaction between a polyol and a polybasic acid. In this way a polymeric chain of the required characteristics for association with the polymer product is built up during the actual polymerisation.

Stable dispersions of condensation polymers can be obtained by the process of the invention in which the disperse particles are of a broad range of sizes. At the one extreme, particles as large as 100μ can be obtained, whilst at the other extreme, by gradual addition of a second reactant to an emulsion of a first reactant, or by utilising an emulsifying agent which participates in the polymerisation reaction, as already described, particle sizes as low as 0.1–10μ can be achieved.

Typical polymer-forming reactants for use in the present invention include polyacids and reactive derivatives thereof such as anhydrides and acid halides. These may be reacted with polyols to form polyesters, or with polyamines to form polyamides. Other reactants include polyisocyanates, polyepoxides, polyaziridines and polynitriles. The invention is thus applicable to the formation of a wide range of condensation polymers and polymers made by step-wise polymerisation.

Examples of suitable polyacids or derivatives thereof include adipic acid, azeleic acid, succinic anhydride, phthalic anhydride, isophthalic acid, terephthalic acid, trimellitic acid, pyromellitic acid, 1:3- and 1:4-cyclohexane dicarboxylic acids and mixtures thereof, as well as inorganic acids such as orthophosphoric acid.

Suitable polyols include ethylene glycol, diethylene glycol, trimethylene glycol, tetramethylene glycol, hexamethylene glycol, tetramethyl ethylene glycol, neopentyl glycol, trimethylolpropane, glycerol, 1:3- and 1:4-cyclohexane diol and p-xylylene glycol, as well as hydroquinone and other polyhydric phenols.

Suitable polyamines include ethylene diamine, hexa methylene diamine, decamethylene diamine, diethylene triamine, piperazine, p-xylylene diamine, and phenylene diamines.

Pre-formed reaction products of a polyacid and a polyol or polyamine may also be used as a single polymer-forming reactant, e.g. bis(hydroxyethyl) terephthalate or hexamethylene diamine adipate ("66 salt").

Detailed reaction conditions which may be used in performing the process of the invention, such as the use of a concentration of emulsifying agent in the range 1–10% by weight of the insoluble reactant or reactants emulsified thereby, are also described in British Pat. No. 1,211,532. The temperature to which the polymer-forming reactant or reactants are heated in performing the process of the invention will in general be that at which the reactant or reactants are heated to effect normal bulk polymerisation, but in many cases it is not necessary to "force" the reaction by progressively increasing the temperature as is customary when operating in bulk. The liquid medium in which the process is carried out will, of course, be selected so that it (or any azeotrope it may form with a by-product) has a boiling point equal to or higher than the reaction temperature.

Some typical liquid/reactant/emulsifying agent/polymer combinations are listed in the Table.

| Reactants | | Liquid Medium | Emulsifying Agent | Polymer Product |
| --- | --- | --- | --- | --- |
| Adipic acid - | emulsified | Aromatic hydrocarbon or | Graft copolymer of 12-hydroxy stearic acid, or, ricinoleic | Crosslinked polyester rubber |
| Diethylene glycol | added as feed | Aliphatic hydrocarbon | acid/methyl methacrylate/ methacrylic acid. | |
| Glycerol | | | | |
| Bis-hydroxy ethyl terephthalate - emulsified | | Aliphatic hydrocarbon | Graft copolymer of 12-hydroxy stearic acid/methyl methacrylate/glycidyl methacrylate. | Polyethylene terephthalate |
| Azelaic acid - | emulsified | Aromatic hydrocarbon or | Graft copolymer of 12-hydroxy stearic acid, or ricinoleic | Crosslinked polyester rubber |
| Diethylene glycol | added as feed | Aliphatic hydrocarbon | acid/methyl methacrylate/ methacrylic acid. | |
| Glycerol | | | | |
| Adipic acid - Hexamethylene diamine | emulsified | Aliphatic hydrocarbon | " | Polyamide |
| Para-amino benzoic acid - emulsified | | Aliphatic hydrocarbon stearic acid/methyl | Graft copolymer of 12-hydroxy methacrylate/methacrylic acid | Polyamide |
| Orthophosphoric acid. | Emulsified | Aliphatic hydrocarbon. | Graft copolymer of poly-(12-hydroxystearic acid)/poly-ethylene oxide/methyl methacrylate/methacrylic acid. | Crosslinked polyester. |
| Glycerol | | | | |
| Succinic anhydride - emulsified. | | Aliphatic hydrocarbon or aromatic hydrocarbon | Graft copolymer of 12-hydroxystearic acid/methyl methacrylate/methacrylic acid. | Linear polyester |
| Ethylene glycol - added as feed. | | | | |
| Phthalic anhydride, Maleic anhydride - emulsified. | | Aliphatic hydrocarbon | " | Unsaturated polyester. |
| Propylene glycol - added as feed | | | | |
| Adipic acid Maleic anhydride - | | Aliphatic hydrocarbon | Graft copolymer of 12-hydroxy stearic acid/methyl meth- | Unsaturated polyester. |

-continued

| Reactants | Liquid Medium | Emulsifying Agent | Polymer Product |
|---|---|---|---|
| emulsified Diethylene glycol - added as feed. | | acrylate/methacrylic acid. | |
| Phthalic anhydride }- Maleic anhydride emulsified Diethylene glycol - added as feed. | Aliphatic hydrocarbon | '' | Unsaturated polyester. |
| Adipic acid } Maleic anhydride - emulsified Diethylene glycol - added as feed. | Aliphatic hydrocarbon | Graft copolymer of 12-hydroxy stearic acid/methyl methacrylate/glycidyl methacrylate/soya bean oil fatty acids. | Unsaturated polyester. |
| Adipic acid - emulsified Diethylene glycol }- Glycerol added as feed. | Aliphatic hydrocarbon | Random graft copolymer from polylauryl methacrylate with pendant methacrylate/ methyl methacrylate/ methacrylic acid. | Crosslinked polyester rubber |
| Bis(hydroxyethyl) terephthalate containing small amounts of the corresponding 1,2-dihydroxypropyl ester. | Aliphatic hydrocarbon | Graft copolymer of 12-hydroxystearic acid/methyl methacrylate/glycidyl methacrylate. | Crosslinked poly(ethylene terephthalate). |
| p-Acetoxybenzoic acid. | Aliphatic hydrocarbon | Graft copolymer of 12-hydroxystearic acid/methyl methacrylate/glycidyl methacrylate - p-hydroxybenzoic acid adduct. | Aromatic polyester. |

The process of the present invention is especially useful when the liquid medium is an organic liquid. In general the process is quicker than bulk or solution polymerisation because of the ease of removal of the reaction by-products, especially where the liquid medium forms an azeotrope with the latter. This is a point of particular significance for certain polymers, for example poly(ethylene terephthalate), where it is essential for the obtaining of a satisfactory product to take the polymerisation substantially to completion. When operating by conventional bulk polymerisation techniques, expensive equipment is required to achieve this result. By means of the present process, the final stages of polymerisation can, in contrast, be completed without special equipment or procedures being necessary. A further advantage of the invention is that the polymer product is thereby obtained in an easily manageable form. The dispersions afforded by the process can readily be made of higher solids contents than is possible with solutions of the same polymer in conventional solvents; moreover in many cases the polymers to which the invention may be applied are soluble only in liquids of unpleasant characteristics, e.g. nylon in formic acid.

The invention will now be illustrated by the following Examples, in which all parts are by weight.

Example 1

The following ingredients were charged to a 2-liter flask fitted with a reflux condenser, a Dean and Stark separator and a propeller-type stirrer.

| | | |
|---|---|---|
| Adipic acid | 365.0 | parts |
| Hydrocarbon (boiling range 190 – 210°C., sulphonable content 95%) | 500.0 | '' |
| Graft copolymer emulsifying agent as a 35.6% solution in butyl acetate/ethyl acetate (7% by weight on reactants) | 113.8 | parts |

The graft copolymer emulsifying agent is a free radical copolymerisation product of the glycidyl methacrylate ester of the self-polyester of 12-hydroxystearic acid (molecular weight ≈ 2,000), methyl methacrylate and methacrylic acid. The weight ratio of the components in the final copolymer being 50:49:1 respectively. The molecular weight of the poly(methyl methacrylate) portion of the graft is ≈ 10,000.

The charge was stirred vigorously and heated to reflux during which time the adipic acid melted and formed a blue translucent emulsion in the hydrocarbon. After half an hour a mixture of diethylene glycol 137.5 parts and glycerol 75.8 parts were gradually fed into the hot reaction mixture over a 3 hour period, whilst the water of condensation was removed. Then 100 parts of a saturated hydrocarbon (boiling range 100°–120°.) were added, followed by 2.69 parts of paratoluene sulphonic acid as condensation catalyst. After being refluxed for a further hour the polyester dispersion precipitated when poured into acetone. The molar acid content was $1.1 \times 10^{-3}$. A 45% solids stable dispersion with a particle size distribution of 0.5–5$\mu$ was obtained.

The dispersion is useful as a rubbery particulate modifier for reducing the brittleness of, for example, urea formaldehyde, or, melamine formaldehyde polymers. The glass transition of the polyester rubber was found to be −36°C. by differential scanning colorimetry (D.S.C.). The gel content by acetone extraction was 76% by weight.

Example 2

A dispersion was prepared as described in Example 1 except that the feed was composed of diethylene glycol 198 parts and glycerol 38.6 parts.

A crosslinked polyester dispersion of 46.2% solids, molar acid content $1.3 \times 10^{-3}$ and particle size in the range 0.5–5$\mu$ was obtained. The glass transition temperature by D.S.C. was −46°C.

Example 3

A dispersion was prepared by the method described in Example 1 except that the feed was composed of diethylene glycol 66 parts, glycerol 115 parts.

A crosslinked polyester dispersion with a particle size distribution in the range 0.5–5$\mu$ was obtained. The glass transition temperature by D.S.C. was −26°C.

Example 4

A dispersion was prepared using the method as described in Example 1 but using a saturated hydrocarbon (boiling range 160°C.–190°C.) instead of the aromatic hydrocarbon.

In this Example a white emulsion of adipic acid in hydrocarbon was obtained initially before feeding in the glycol and glycerol.

The particle size of the crosslinked polyester dispersion was 0.5–10$\mu$ and the glass transition temperature by D.S.C. was −41°C.

Example 5

Using the apparatus described in Example 1 the following were charged to the flask:

| | | |
|---|---|---|
| Azelaic acid | 376.0 | parts |
| Saturated hydrocarbon (boiling range 160 – 190°C.) | 500.0 | '' |
| Graft copolymer emulsifying agent solution (as in Example 1) | 113.8 | parts |

The charge was brought to reflux with vigorous stirring and a white emulsion of azelaic acid in hydrocarbon was obtained. After 15 minutes a mixture of diethylene glycol 106 parts and glycerol 61.4 parts was gradually added over 3 hours to the reflux mixture, whilst the water of condensation was removed. 100 parts of a saturated hydrocarbon (boiling range 100°–120°C.) followed by 3 parts of para-toluene sulphonic acid were then added. Heating was continued for a further 2 hours when 65 parts of water had been removed and the dispersion precipitated when poured into acetone. A crosslinked dispersion, particle size distribution 0.5–10$\mu$ and useful as a rubbery particulate modifier of brittle resins such as urea and melamine formaldehyde, was obtained.

Example 6

A dispersion was prepared using the process of Example 4 using the same reactants and under the same conditions except that the emulsifying agent was replaced with 115 parts of a 34.7% solution of a stabiliser which was a graft copolymer of the glycidyl methacrylate ester of polyricinoleic acid (molecular weight ≈ 2,000), methyl methacrylate and methacrylic acid, weight ratio 50:49:1 respectively.

A crosslinked dispersion of a polyester particle size 0.5–10$\mu$ was obtained. A dispersion with this type of stabiliser is useful since it contains unsaturation which will co-react with, for example, alkyd resins.

Example 7

A dispersion was prepared using the process of Example 1 but in which a graft copolymer of only the glycidyl methacrylate ester of poly(12-hydroxystearic acid) and methyl methacrylate, 1:1 by weight, was used as the emulsifying agent.

In this case a coarse dispersion with particles in the range 10–50$\mu$ with some even larger droplets was obtained.

Example 8

A dispersion was prepared as in Example 1 but in which the emulsifying agent was a graft copolymer of the glycidyl methacrylate ester of poly(12-hydroxystearic acid), methyl methacrylate and methacrylic acid in the weight ratio 50:45:5 respectively. The conditions and weights of the other reactants were the same as in Example 1.

A crosslinked polyester dispersion with a particle size of 1–5$\mu$, molar acid content 1.2 × 10$^{-3}$ and solids content 46.3% was obtained.

Example 9

A polyester dispersion similar to that of Example 4 but in which all the reactants were introduced into the flask at the same time was prepared using the same apparatus as that used in Example 1.

| The following were charged to the flask: | | |
|---|---|---|
| Saturated aliphatic hydrocarbon (boiling range 160° – 190°C.) | 416.0 | parts |
| Emulsifying agent solution (as Example 1) | 71.0 | '' |
| Adipic acid | 365.0 | '' |
| Diethylene glycol | 117.5 | '' |
| Glycerol | 115.0 | '' |

The contents were brought to reflux temperature with vigorous stirring and the water of condensation was removed over a period of 9 hours until the reaction was 92% completed. A coarse dispersion with a wide particle size distribution of 10–100$\mu$ was obtained.

Example 10

Using the apparatus as described in Example 1 the following were charged to the flask:

| | | |
|---|---|---|
| Adipic acid | 365 | parts |
| Aliphatic hydrocarbon (boiling range 190 – 210°C.) | 500 | '' |
| Emulsifying agent solution (as in Example 8) | 115 | '' |

The mixture was brought to reflux with vigorous stirring and the following solution was then fed in over a 2 hour period:

| | | |
|---|---|---|
| Hexamethylene diamine | 288 | parts |
| Water | 70 | '' |

The water of condensation and additional water were removed by azeotropic separation. In all 160 parts of water were removed — close to the theoretical amount for complete reaction.

A stable dispersion with a particle size of 1–5$\mu$ and a solids content of 48.5 wt.% was obtained. The dispersion of this Example is useful for example in coating glass fibre strands to prevent fibre breakdown and increase flexural strength.

Example 11

164.2 parts of phthalic anhydride and 217 parts of maleic anhydride were added to a solution of 482 parts of aliphatic hydrocarbon (boiling range 140–160°C.)

containing 178.6 parts of 33% solution in ester solvents of a graft copolymer comprising 50 parts by weight of poly(12-hydroxystearic acid) methacrylate, 49 parts of methyl methacrylate and 1 part of methacrylic acid. The mixture was heated with vigorous stirring to 100°–110°C. when a fine particle size emulsion was formed. The emulsion was heated to reflux with vigorous stirring in an apparatus fitted with a means of azeotropic removal of water and 278.3 parts of propylene glycol were fed into the refluxing mixture over 3 hours. When the addition of the glycol was complete, 1.4 parts of para-toluene sulphonic acid were added and reflux continued until the theoretical yield of water was removed and the dispersion polymer had an acid value of 50 mg. KOH/gm. The dispersion was cooled and filtered and was found to have a particle size of 0.1–5$\mu$.

Example 12

164.2 parts of phthalic anhydride and 217 parts of maleic anhydride were emulsified and reacted in the manner described in Example 11, except that the propylene glycol was replaced by 286.9 parts of diethylene glycol.

A polyester dispersion of acid value 20 mgm. KOH/gm. was obtained after a reaction time of 6 hours, which had a particle size of 0.1–5$\mu$.

Example 13

148 parts of phthalic anhydride and 196 parts of maleic anhydride were emulsified in the manner described in Example 11 in 603 parts of aliphatic hydrocarbon (boiling range 140°–160°C.) containing 203 parts of the graft copolymer solution of Example 11.

159 parts of diethylene glycol were added rapidly to the anhydride dispersion with vigorous stirring at 140°C. The dispersion was held at 140°C. for 30 minutes in order to form the half-ester of the anhydrides after which the temperature was raised to that of reflux and a further 169 parts of diethylene glycol were added over 1 hour. 1.4 parts of para-toluene sulphonic acid were added and reflux continued for a further 4 hours when a polymer dispersion of acid value 26 mgm. KOH/gm. was obtained. A sample of the dispersion was heated in a rotary evaporator under reduced pressure (water pump) and solvent removed until the solids content was 75.5%.

A stable, viscous dispersion was obtained having a viscosity of 2.5 poises as measured on a cone and plate viscometer at 25°C.

Example 14

The preparation as described in Example 13 was repeated except that the para-toluene sulphonic acid used as catalyst was replaced by an equal weight of tetrabutyl titanate. A product with an acid value of 52 mgm. KOH/gm. was obtained in 3 hours reaction time.

Example 15

The preparation as described in Example 14 was repeated except that the 148 parts of phthalic anhydride was replaced by 146 parts of adipic acid.

A dispersion at 75.1% solids and acid value 30 mgm. KOH/gm. was obtained after reaction and solvent stripping.

Example 16

The preparation as described in Example 15 was repeated except that the stabiliser level was reduced from 203 parts of the 33% solution to 51 parts of the solution at the same concentration.

A stable dispersion at 75.4% solids and an acid value of 32 mgm. KOH/gm. was obtained after reaction and solvent stripping.

Example 17

146 parts of adipic acid and 196 parts of maleic anhydride were emulsified in 606 parts of aliphatic hydrocarbon (boiling range 140°–160°C.) with rapid vigorous stirring in the presence of 42.8 parts of a 40% solids solution in ethyl acetate of a graft copolymer comprising 25 parts of poly(12-hydroxystearic acid) methacrylate, 34.4 parts of methyl methacrylate and 15.6 parts of glycidyl methacrylate. After the polymerisation to form the graft copolymer, the glycidyl groups of the graft copolymer were reacted with 25 parts soya bean oil fatty acids until an acid value of 1–2 mgm. KOH./gm. were obtained.

When emulsification of the mixed anhydrides was complete 159 parts of diethylene glycol were added and the preparation completed as in the manner described in Example 16.

A fine particle size dispersion of acid value 26 mg KOH/gm. and at 75% solids was obtained after solvent stripping.

Example 18

100 parts of the polyester dispersion as prepared in Example 15 was mixed with 25 parts of styrene monomer and 2 parts of methyl ethyl ketone peroxide and, after mixing, 1% of a 10% solution of cobalt naphthenate in white spirit. Films were cast and allowed to cure. A tough, rubbery film resulted.

Example 19

100 parts of a polyester composition of acid value 35 mgm.KOH/gm. derived from the condensation of 3 moles of diethylene glycol, 2 moles of maleic anhydride and 1 mole of adipic acid, were heated to 130°C. and added slowly under conditions of vigorous shear to 100 parts of aliphatic hydrocarbon of boiling range 140°–160°C. containing 33 parts of a 33% solids solution in ethyl acetate of a graft copolymer comprised of 50 parts of poly(12-hydroxystearic acid) methacrylate, 49 parts of methyl methacrylate and 1 part of methacrylic acid.

A coarse particle size dispersion resulted which rapidly settled.

Example 20

100 parts of the half-ester of diethylene glycol with maleic and phthalic anhydrides prepared by heating 1.5 moles of diethylene glycol with 1 mole of phthalic anhydride and 2 moles of maleic anhydride at 140°C. for 30 minutes were added slowly at 130°C. to 100 parts of aliphatic hydrocarbon (boiling range 140°–160°C.) containing 33 parts of a 33% solids solution in ester of the graft copolymer described in Example 19. Vigorous shear was applied to the mixture which resulted in the formation of a coarse emulsion which settled completely after standing for 48 hours.

Example 21

The following ingredients were charged to a 2-liter baffled flask fitted with a reflux condenser, a Dean and Stark and a propeller-type stirrer.

| | | |
|---|---|---|
| Bis(hydroxyethyl) terephthalate | 280 | parts |
| Aliphatic hydrocarbon (boiling range 230 – 250°C.) | 420 | parts |
| Graft copolymer emulsifying agent as a 40.5% solution in white spirit (5% by weight on reactant) | 34.6 | parts |

The graft copolymer emulsifying agent is a free radical copolymerisation product of the glycidyl methacrylate ester of the self-polyester of 12-hydroxystearic acid (molecular weight ≃ 2,000), methyl methacrylate and glycidyl methacrylate. The weight ratio of the components in the final copolymer is 50:45:5 respectively. The molecular weight of the poly(methyl methacrylate) portion of the graft is ≃ 15,000.

The reactant, bis(hydroxyethyl) terephthalate, was made by the ester interchange reaction of dimethyl terephthalate and ethylene glycol, using calcium acetate as catalyst, according to British Pat. No. 742,811. The bis(hydroxyethyl) terephthalate thus formed contained ≃ 8% free ethylene glycol and ≃ 0.06% calcium acetate.

The charge was heated until the monomer melted (≃ 140°C.) and was then stirred vigorously to emulsify the melt. The emulsion was brought to reflux and ethylene glycol from the polycondensation reaction was removed by azeotropic distillation. The condensation was complete in 2–3 hours, the final reflux temperature being ≃ 250°C.

A 33% solids dispersion of particle size distribution 1–20$\mu$ was obtained. It could be filtered using a Buchner flask and water pump to obtain the poly(ethylene terephthalate) powder, which has a melting point of 254°C. as determined by differential scanning colorimetry.

Example 22

A dispersion was prepared as in Example 21 except that the ester reactant used contained a small amount of the corresponding 1,2-dihydroxypropyl ester. This was achieved by including in the ester interchange reaction of dimethyl terephthalate 5% by weight of glycerol based on the ethylene glycol taken.

A 33% solids dispersion of particle size distribution 1–20$\mu$ was obtained. The dispersion could be filtered as in Example 21. The crosslinked poly(ethylene terephthalate) powder obtained had no melting point below 300°C.

Example 23

The following ingredients were charged to a 1 liter flask fitted with a reflux condenser, Dean and Stark separator and glass stirrer with an anchor-type polytetrafluoroethylene blade.

| | | |
|---|---|---|
| p-Acetoxybenzoic acid | 90 | parts |
| Aliphatic hydrocarbon (boiling range 230 – 250°C.) | 210 | parts |
| Graft copolymer emulsifying agent as a 37.8% solution in white spirit | 11.9 | parts |

The graft copolymer emulsifying agent is a free radial copolymerisation product of the glycidyl methacrylate ester of the self-polyester of 12-hydroxystearic acid (molecular weight ≃ 2,000), methyl methacrylate and glycidyl methacrylate, in which ≃ 65% of the epoxy groups have been reacted with p-hydroxy benzoic acid. The weight ratio of the components before reaction with p-hydroxy benzoic acid is 50:40:10, poly-12-hydroxystearic acid: methyl methacrylate:glycidyl methacrylate. The molecular weight of the poly(methyl methacrylate) portion of the graft is ≃ 15,000.

The reactant, p-acetoxy benzoic acid, was made by reacting p-hydroxy benzoic acid with acetic anhydride in dilute sodium hydroxide solution, and purifying by re-crystallisation from xylene.

The charge was heated with stirring until the reactant melted (≃ 180°C.) and then stirred vigorously to emulsify the melt. The emulsion was brought to reflux and acetic acid from the polycondensation reaction was removed by azeotropic distillation. The condensation was complete in 2–3 hours, the final reflux temperature being ≃ 250°C.

A 20% solids dispersion was obtained of primary particle size 1–15$\mu$. Flocculation of particles had occurred to a small extent, the size of the dispersed aggregates being from 10–50$\mu$. The polyester powder could be obtained by filtration as in Example 21 and showed no sign of melting below 400°C.

What we claim is:

1. A process for the preparation of a dispersion of finely divided particles of a condensation polymer selected from the group consisting of polyesters and polyamides in a liquid medium in which the polymer is insoluble which comprises heating in the liquid medium at a temperature of at least 150°C. at least one reactant which undergoes a condensation polymerization reaction to form a polyester or polyamide with the elimination of a by-product of low molecular weight, the liquid medium having a boiling point not lower than the reaction temperature, at least one of the reactants being insoluble in said liquid medium and present as a liquid disperse phase in an emulsion in which the emulsifying agent is a polymeric material containing in its molecule at least one chain-like component of a type which is soluble and non-self-associated in the liquid of the disperse phase and at least one chain-like component of another type which is soluble and non-self-associated in the liquid of the continuous phase, the average molecular weight of the individual components being at least 1,000, the total molecular weight of the individual components of each type being at least 3,000 or at least $n \times 1,000$, where $n$ is the number of the individual components of the other type, whichever is the higher, and the ratio of the total weights of the individual components of the two types being from 3:1 to 1:3, one of the chain-like components of an emulsifying agent present which is soluble in a disperse phase also being provided with a reactive group selected from the group consisting of glycidyl groups and carboxyl groups which can take part in the condensation polymerization reaction so as to form a component capable of associating with the polymer produced.

2. A process as claimed in claim 1, wherein at least one polymer-forming reactant is solid at room temperature but can be melted in the liquid medium.

3. A process as claimed in claim 1 wherein the liquid medium is capable of forming with the polymerization by-product an azeotrope having a boiling point not lower than the reaction temperature.

4. A process as claimed in claim 1, wherein part of the reactant or reactants is emulsified initially and the remainder is added as the polymerization reaction proceeds.

5. A process as claimed in claim 4, wherein the addition of a reactant or reactants during the course of the polymerisation reaction is carried out under conditions of rigorous shearing.

6. A process as claimed in claim 1, wherein a catalyst for the polymerization reaction is also present.

7. A process as claimed in claim 1, wherein the component of an emulsifier present which is capable of associating with the polymer produced contains polar groups which can interact with complementary polar groups in the polymer produced.

8. A process as claimed in claim 1, wherein the component of an emulsifier present which is capable of associating with the polymer produced comprises a polymeric chain of the same or similar chemical composition as that of the polymer produced.

9. A process as claimed in claim 8, wherein the said component of the emulsifier possesses reactive sites which are capable of participating in the polymerisation reaction.

10. A process as claimed in claim 1, wherein the concentration of emulsifying agent is in the range 1-10% by weight of the insoluble reactant emulsified thereby.

* * * * *